(12) United States Patent
Meyer-Blumenroth et al.

(10) Patent No.: US 9,630,148 B2
(45) Date of Patent: Apr. 25, 2017

(54) FILTER COMPOUND MATERIAL, METHOD FOR THE PRODUCTION THEREOF AND FLAT FILTER ELEMENTS MADE OF THE FILTER COMPOUND MATERIAL

(75) Inventors: Ulrich Meyer-Blumenroth, Idstein-Woersdorf (DE); Eugen Man, Hunzel (DE); Reinhard Voigt, Gotha (DE)

(73) Assignee: Microdyn-Nadir GmbH, Wiesbaden (DE)

( * ) Notice: Subject to any disclaimer, the term of this patent is extended or adjusted under 35 U.S.C. 154(b) by 565 days.

(21) Appl. No.: 12/936,874

(22) PCT Filed: Apr. 7, 2009

(86) PCT No.: PCT/EP2009/002543
§ 371 (c)(1),
(2), (4) Date: Oct. 7, 2010

(87) PCT Pub. No.: WO2009/127345
PCT Pub. Date: Oct. 22, 2009

(65) Prior Publication Data
US 2011/0024348 A1    Feb. 3, 2011

(30) Foreign Application Priority Data
Apr. 15, 2008 (DE) .................. 10 2008 019 085

(51) Int. Cl.
*B01D 63/08* (2006.01)
*B01D 69/06* (2006.01)

(52) U.S. Cl.
CPC .......... *B01D 63/081* (2013.01); *B01D 69/06* (2013.01); *B01D 2325/24* (2013.01); *Y10T 156/10* (2015.01)

(58) Field of Classification Search
CPC .. B01D 63/081; B01D 2325/24; B01D 69/06; Y10T 156/10
USPC ......... 210/435, 490, 321.61, 321.75, 321.84, 210/335, 346, 347, 314, 493.1; 156/60
See application file for complete search history.

(56) References Cited

U.S. PATENT DOCUMENTS

| | | | |
|---|---|---|---|
| 3,592,767 A * | 7/1971 | Pall ............................. | 210/490 |
| 4,478,620 A * | 10/1984 | Tamura .......................... | 55/486 |
| 4,584,103 A * | 4/1986 | Linder et al. ................. | 210/650 |
| 4,919,810 A * | 4/1990 | Itoh et al. ................ | 210/500.34 |
| 6,423,123 B1 * | 7/2002 | Rosenberg et al. ............. | 96/154 |
| 2004/0038606 A1 * | 2/2004 | Field et al. ..................... | 442/74 |
| 2006/0086654 A1 * | 4/2006 | Voigt et al. ................ | 210/321.6 |
| 2006/0249447 A1 * | 11/2006 | Yeager .......................... | 210/506 |

FOREIGN PATENT DOCUMENTS

| | | |
|---|---|---|
| DE | 37 12 872 A1 | 10/1987 |
| DE | 20 2005 012 047 U1 | 5/2003 |
| EP | 0 417 287 B1 | 6/1994 |

(Continued)

Primary Examiner — Madeline Gonzalez
(74) Attorney, Agent, or Firm — ProPat, L.L.C.

(57) ABSTRACT

A filter composite material is provided that includes first and second filtration membranes and a drainage material arranged therebetween. The drainage material and the filtration membranes are laminated using adhesive nets. A flat filter element is made as a blank from the filter composite material and has a geometric shape adapted to the particular end use.

32 Claims, 3 Drawing Sheets

(56) References Cited

FOREIGN PATENT DOCUMENTS

| EP | 0 730 490 B1 | 4/1996 |
| EP | 1 554 028 B1 | 4/2004 |
| WO | WO 99/36150 A1 | 7/1999 |
| WO | WO 99/36150 A2 | 7/1999 |
| WO | WO 2004007190 A1 | 1/2004 |

* cited by examiner

FILTER COMPOUND MATERIAL, METHOD FOR THE PRODUCTION THEREOF AND FLAT FILTER ELEMENTS MADE OF THE FILTER COMPOUND MATERIAL

CROSS-REFERENCE TO RELATED APPLICATIONS

This application is being filed under Rule 1.371 as a National Stage Application of pending International Application No. PCT/EP2009/002543 filed Apr. 7, 2009, which claims priority to parent application German Patent Application No. 10 2008 019 085.3, filed Apr. 15, 2008. Both International Application No. PCT/EP2009/002543 and German Patent Application No. 10 2008 019 085.3 are hereby incorporated by reference herein in their entirety.

FIELD OF THE INVENTION

This invention relates to a filter composite material comprising a woven drainage fabric and first and second filtration membranes laminated to the top and bottom sides of the woven drainage fabric, and to a method for producing the filter composite material and to flat filter elements produced therefrom.

BACKGROUND OF THE INVENTION

Filter composite materials are known in the prior art and used in the manufacture of flat filter elements, wound filters and the like. Conventional filter systems for wastewater cleaning include flat filter elements in a spaced-apart parallel arrangement. The flat filter elements are embodied as cushions or cassettes in which a drainage structure formed as flexible woven fabric or rigid plate is surrounded on both sides by filtration membranes. The filtration membrane is typically formed as a two-layered composite structure formed from a support nonwoven and a porous membrane layer. The regions between adjacent flat filter elements form channels for a liquid to be filtered, which in accordance with the principle of cross flow filtration flows parallel to the surface of the flat filter elements and hence perpendicularly to the filtration direction.

EP 0 730 490 B1 (whose United States equivalent is U. S. Pat. No. 5,804,280) discloses a filter composite structure comprising a porous filter medium, a porous support medium, and a substrate including a drainage mechanism; and also a method of forming the composite structure. The porous filter medium and the porous support medium are solvent bonded to the substrate in such a manner that the permeability of the filter medium is not substantially decreased. In preferred embodiments, the substrate consists of a polymeric material and includes grooves and the region between adjacent grooves is adhered to the porous support medium. In a further embodiment, the substrate is formed as a sheet or plate having opposing planar surfaces and each planar surface is solvent adhered to a porous support medium and a porous filter medium. The composite structure is formed by a method comprising the following steps:
- positioning the porous filter medium, the porous support medium and the substrate on top of each other;
- introducing a bonding composition which merely dissolves the substrate slightly and flows into the porous support medium and the porous filter medium, the dissolved substrate being introduced in the process solidifying after removal of the bonding composition and bonding the three layers together.

DE 37 12 872 A1 describes filter elements composed of a membrane and a through-flowable drainage structure. The drainage structure consists of a woven fabric, a nonwoven fabric, a perforate or embossed foil, or a combination of these layer materials. The essentially flat filter elements of n-angular or round shape include an aperture for fluid conduction and are adhered or welded at their edges and around the aperture in a leakproof manner. In particular embodiments, the membrane is one- or both-sidedly area-bonded, in the form of a laminate, to a woven fabric and/or a nonwoven fabric. The woven/nonwoven fabric therein is in each case bonded to one membrane only.

German utility model DE 20 2005 012 047 U1 discloses a two- or more-layered composite filter medium for removing particles from a fluid stream, comprising a membrane filtration layer and at least one upstream depth filtration layer. Optionally, the composite filter medium may comprise a supporting layer disposed upstream or downstream of the membrane filtration layer. Optionally, the supporting layer may be laminated with the membrane. Preferably, the depth filtration layer, the membrane filtration layer and the optional supporting layer consist of polymeric melt-blown polymer fiber woven fabric, of expanded PTFE (ePTFE) membrane filtration medium and of spun bonded nonwoven, respectively. The optional support layer is in each case only bonded to one membrane filtration layer.

EP 1 554 028 B1 teaches a filter element with multi-layered pleat support. The filter element comprises an upstream pleat support, a filter medium, a multilayered downstream support including a first downstream support layer and a second downstream support layer. The filter medium is typically a microporous filter medium having a pore size of about 0.1 μm to about 10 μm and consisting of conventional filter materials such as, for example, expanded Teflon, nylon, polyether sulfone, polyvinylidene difluoride and the like. The support layers are preferably fabricated from polymeric non-woven fibrous materials, and the first support layer may be laminated to the filter medium. Lamination can be carried out as per conventional laminating techniques known in the prior art.

EP 0 417 287 B1 (whose United States equivalent is U. S. Pat. No. 5,112,487) describes a porous, heterogeneous membrane consisting of a phenylenesulfide-based copolymer and laminated on a polymeric woven or nonwoven fabric.

When a filter system is in operation, particles having diameters too large to pass through the pores of the membrane layer are retained on the membrane surface and some of them remain attached thereto. Such particles accumulate over prolonged periods and build up to form filter cake which increasingly blinds the membrane surfaces and reduces the filtration performance of the system. As part of the equipment maintenance service, the surfaces of the filtration membranes are periodically cleaned mechanically and/or chemically and freed of filter cake, for example by means of brushing, water jet and cleaning solutions. In addition to these inconvenient and costly cleaning methods, which generally necessitate the deinstallation of the filter elements, an in situ clean by means of backflushing is a possibility. In backflushing, the filter elements are briefly operated, not with underpressure, but with an increased inner pressure such that liquid will flow from the interior of the filter element through the filtration membranes to the outside and detach particles attaching to the surface of the filtration membranes. This backflush is done periodically during ongoing operation, the period interval and the ratio of filtration time to backflush time depending on the current filtration conditions with the period interval typically being between 1 and 300 min, preferably between 5 and 100 min and more preferably between 8 and 30 min. The cleaning effect of backflushing mainly depends on the force acting on attached particles. This force is a function of the internal pressure in the filter element. The increased internal pressure may cause damage to the filter element in that increased internal pressure frequently causes cracks in and delaminations of the filtration membrane. Delamination can occur within a filtration membrane between the support nonwoven and the porous membrane layer, or between the filtration membrane and the drainage structure. As a consequence of delamination, the filtration membrane or the porous membrane layer will frequently inflate to such a degree that it will press against an adjacent filter element, causing the backflush to completely cease at the points affected and the attached filter cake being to some extent pressed into the membrane surfaces.

To avoid such trouble and damage, the internal pressure in backflushing is typically limited to values below 0.05 bar. Increasing the internal pressure to values above 0.05 bar would improve the effectiveness of cleaning by means of backflushing and lengthen the intervals between the costly and inconvenient chemo-mechanical cleans.

SUMMARY OF ADVANTAGEOUS EMBODIMENTS OF THE INVENTION

It is an object of the present invention to provide a filter composite material which is inexpensive to produce and has improved backflushability compared with the prior art.

DETAILED DESCRIPTION OF ADVANTAGEOUS EMBODIMENTS OF THE INVENTION

Figure 1:
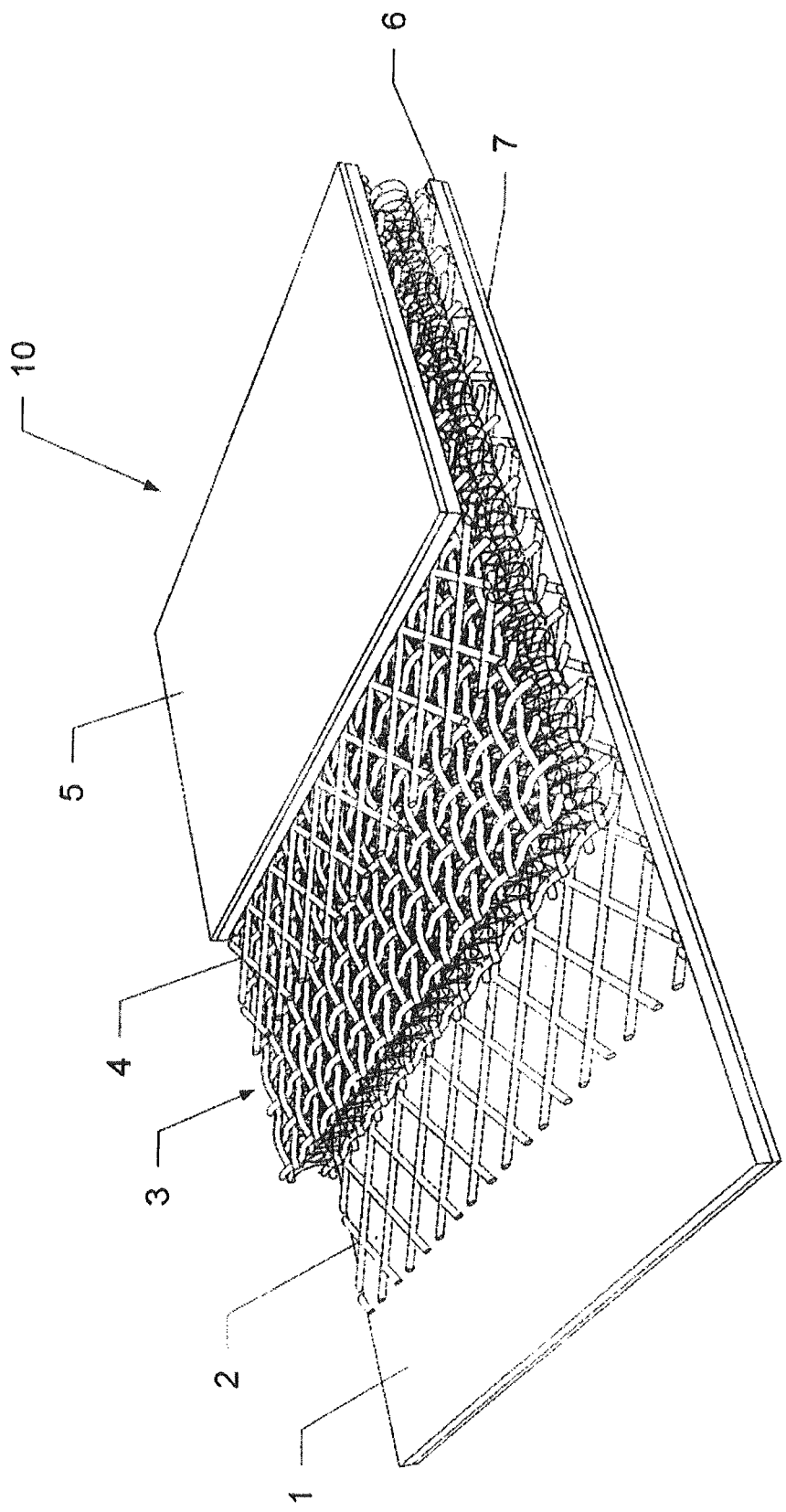
FIG. 1 is a partly cut perspective view of an exemplary filter composite material in an exploded illustration.

We have found that this object is achieved by a filter composite material comprising a woven drainage fabric and first and second filtration membranes laminated to the top and bottom sides of the woven drainage fabric, wherein the lamination between the woven drainage fabric and the filtration membranes has a dynamic pressure stability above 0.15 bar. In further developments of the invention, the lamination between the woven drainage fabric and the filtration membranes has a dynamic pressure stability of above 0.2 bar, preferably above 0.25 bar and more preferably above 0.3 bar.

Here and hereinbelow the term "dynamic pressure stability" refers to the amplitude of the backflush internal pressure under the varying pressure conditions between filtration (underpressure) and backflushing (increased internal pressure) which a filter element experiences during its life cycle. By contrast, the bursting pressure (=static pressure stability) of the filter composite material of the present invention under monotonous or static loading with an increased internal pressure is distinctly above 1 bar.

In an advantageous embodiment, the filter composite material is ribbon shaped and has a length in the range from 5 to 500 m, preferably in the range from 10 to 100 m and more preferably in the range from 20 to 60 m, its width being in the range from 0.5 to 20 m, preferably in the range from 0.8 to 10 m and more preferably in the range from 0.9 to 2 m.

Preferably, the woven drainage fabric is formed as a loop-formingly knitted spacer fabric. Prior art loop-formingly knitted spacer fabrics consist of first and second sheetlike loop structures and disposed between said first and second loop structures a system of pile threads. The pile threads are spaced orderly relative to each other and in the warp or weft direction of the loop structures, each pile thread passing alternatingly through loops of the first and second loop structures such that the pile thread describes a sawtooth- or spiral-shaped course. The material for loop-formingly knitted spacer fabrics suitably comprises plastics—particularly polyesters, and also inorganic materials, for example glass fibers or metals. The thickness of the loop structures is between 0.1 to 4 mm and the system of pile threads is 0.3 to 10 mm high. The stitch density of the system of pile threads is in the range from 100 to 300 $cm^{-2}$ and the pile thread has a linear density in the range from 30 to 100 dtex. Preferably, the loop-formingly knitted spacer fabric is in a thermally cured state. Thermally cured loop-formingly knitted spacer fabrics are produced in two steps. First, a loop-formingly knitting machine is used to produce a loop-formingly knitted spacer fabric including pile threads of a thermoplastic polymer, wherein the pile threads merely deform elastically. Then, the loop-formingly knitted spacer fabric is briefly heated to a temperature above the glass transition temperature of the thermoplastic polymer, causing the pile threads to become embossed with the sawtooth- or spirallike shape predetermined by the loop-formingly knitted pattern. On a mechanical load being opposed on the cured loop-formingly knitted spacer fabric, the pile threads deform elastically and on removal of the load return to the embossed sawtooth- or spirallike shape. Accordingly, the thermally cured loop-formingly knitted spacer fabric is notable for enhanced stiffness and a kind of shape memory.

The woven drainage fabric and the filtration membranes are preferably attachingly face-bonded together by means of adhesive nets. More particularly, the adhesive net consists of a thermoplastic polymer having a melting point in the range from 80 to 200° C., preferably in the range from 100 to 180° C. and more preferably in the range from 120 to 160° C. Adhesive nets of thermoplastic polymers are shaped by means of engraved rolls for example. Accordingly, differently shaped mesh patterns can be produced. The bond strength and pressure stability of a lamination produced using an adhesive net is essentially determined by the mesh density and the basis weight of the adhesive net. Mesh density refers to the number of openings per unit area of the adhesive net.

The filter composite material of the present invention is laminated using adhesive nets having a mesh density in the range from 10 000 to 400 000 $m^{-2}$, preferably in the range from 100 000 to 350 000 $m^{-2}$ and more preferably in the range from 200 000 to 300 000 $m^{-2}$. The basis weight of the adhesive net is in the range from to 80 $g \cdot m^{-2}$, preferably in the range from 20 to 60 $g \cdot m^{-2}$ and more preferably in the range from 30 to 50 $g \cdot m^{-2}$.

In a further development of the invention, the filtration membrane consists of a support nonwoven and a porous membrane layer, the support nonwoven being disposed adjacent to the woven drainage fabric. The porous membrane layer is bonded to the support nonwoven by wet coagulation or lamination.

In wet coagulation, the porous membrane layer is deposited on the support nonwoven; otherwise, it is laminated onto the support nonwoven.

Preferably, the porous membrane layer consists of polyether sulfone, polysulfone, polyacrylonitrile, polyvinylidene fluoride, polyamide, polyether imide, cellulose acetate, regenerated cellulose, polyolefin or fluoropolymer. The porous membrane layer is for example produced by a nonwoven or woven fabric being coated with polymer solution and the polymer being precipitated out in a subsequent phase inversion step. Alternatively, a polymeric sheet is suitably stretched to produce pores in the polymeric sheet. The stretched polymeric sheet is then laminated onto a support nonwoven for mechanical stabilization. Filtration membranes produced by these methods are commercially available, for example as NADIR® membranes (MICRODYN-NADIR GmbH, Wiesbaden) or CELGARD® Flat Sheet Membranes (Celgard Inc., Charlotte, NC, USA).

It is a further object of the present invention to provide a method for producing the filter composite material described above. We have found that this object is achieved by a method wherein a first ribbon-shaped filtration membrane, a first ribbon-shaped adhesive net of thermoplastic polymer, a ribbon-shaped woven drainage fabric, a second ribbon-shaped adhesive net of thermoplastic polymer and a second ribbon-shaped filtration membrane are each supplied from a separate stock reservoir reel and combined in a pressure roll couple to form a ribbon-shaped stack, the ribbon-shaped stack is heated at its top and bottom sides in a heated roll couple and subsequently cooled such that the first and second adhesive nets melt and subsequently cool, causing the woven drainage fabric to become durably adhesion bonded to the filtration membranes.

The present invention further has the object to provide a flat filter element that has improved back-flushability compared with the prior art.

We have found that this object is achieved by fabricating from the above-described filter composite material a blank having an appropriate geometry, preferably of square, rectangular, hexagonal, oval or round shape, for the particular use and sealing it liquidtight all around edgeside.

The edge sealing is effected by means of known methods, for example bonding the woven drainage fabric to the filtration membranes by thermal or ultrasonic welding;

adhering, in which case a liquid adhesive is introduced between the drainage element and the filtration membranes, and cured/crosslinked, in an edge region of the flat filter element;

dip cementing, in which case an edge region of the flat filter element has an adhesive applied to it on the top and bottom sides and also on the cut face/abutting edge;

machine stitching with a thread; or by means of a mechanical clamping device.

One or more outflow openings are then formed by using a mechanical cutting tool or laser to cut out and remove a portion of a filtration membrane. It is frequently advantageous to lead an outflow line through one or more flat filter elements in a mutually parallel (stack) arrangement. For this, the flat filter elements have to have on both sides outflow openings of congruent equiareal geometry. To this end, the first and second filtration membranes and any woven drainage fabric in between are cut out in the requisite geometry and removed.

Finally, the outflow openings are connected to outflow lines, preferably adhesively.

The flat filter elements thus obtained withstand an internal pressure of above 0.15 bar, preferably above 0.2 bar and more preferably above 0.3 bar intact under a varying pressure load which corresponds to the working phases of filtration and backflushing.

Figure 2:
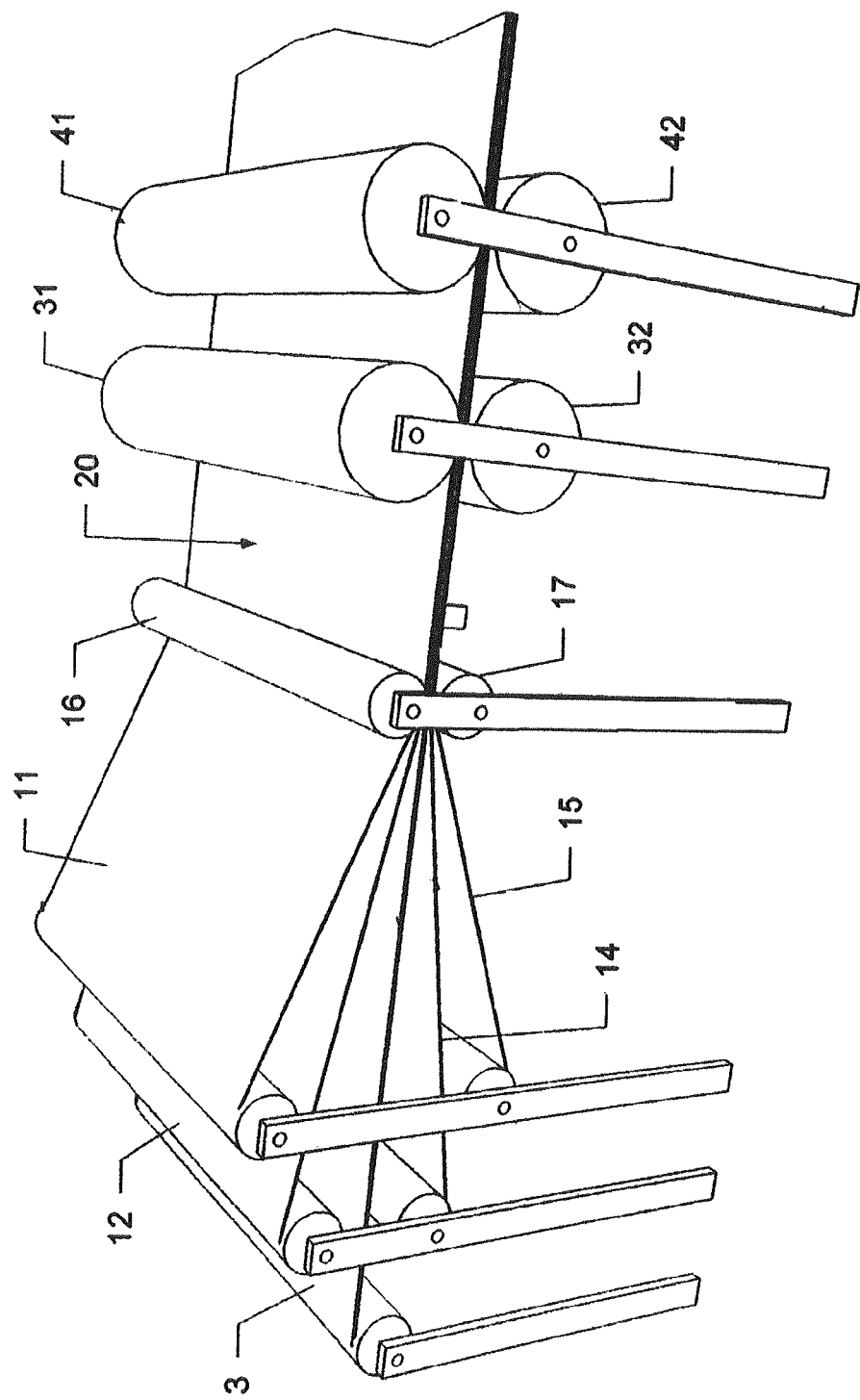
FIG. 2 is a schematic illustration of an exemplary device for producing a filter composite material.
Figure 3:
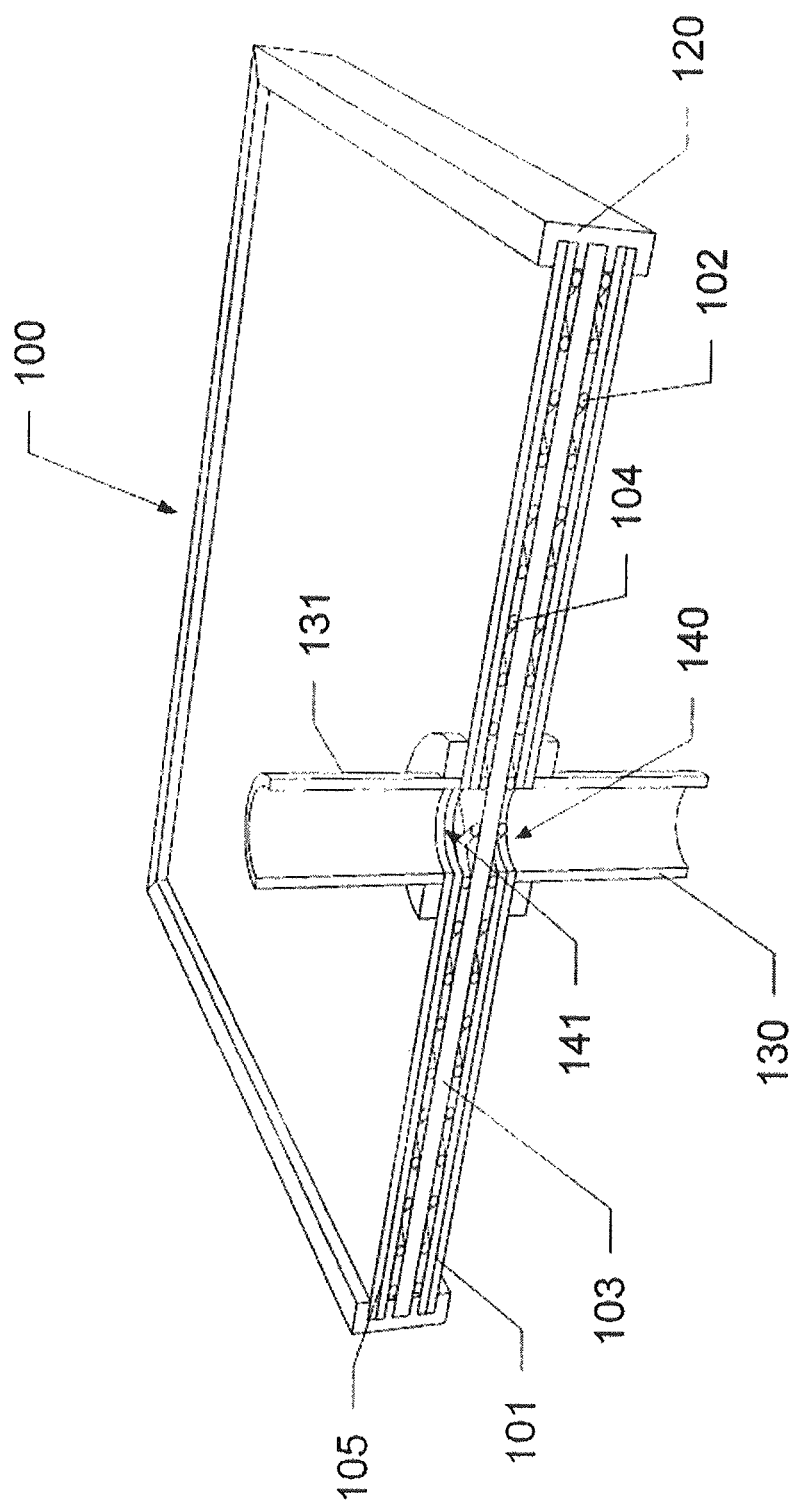
FIG. 3 is a perspective sectional view of an exemplary flat filter element.

The invention will now be more particularly described with reference to the schematic illustrations in the figures, where FIG. 1 shows a partly cut perspective view of a filter composite material in an exploded illustration, FIG. 2 shows a schematic illustration of a device for producing a filter composite material, and FIG. 3 shows a perspective sectional view of a flat filter element.

FIG. 1 illustrates a filter composite material 10 comprising a first filtration membrane 1, a first adhesive net 2, which consists of a thermoplastic polymer, a woven drainage fabric 3, a second adhesive net 4 of a thermoplastic polymer and a second filtration membrane 5. The filtration membranes 1 and 5 are bonded to the woven drainage fabric 3 by thermal or ultrasonic welding, adhering, machine stitching or mechanical clamping for example. The bonding lines/seams are schematically indicated by the reference numerals 6, 7.

The FIG. 1 filter composite material is formed from the continuous sheet material 20 fabricated by means of a device schematically illustrated in FIG. 2. For this, a first filtration membrane ribbon 11, a first adhesive net ribbon 12, a woven drainage fabric ribbon 13, a second adhesive net ribbon 14 and a second filtration membrane ribbon 15 run off respective stock reservoir reels and are joined together in a couple of pressure rolls 16, 17 to form a ribbon-shaped stack. This stack passes through a heated roll couple 31, 32, in which each roll is heated, and through a further pressure roll couple 41, 42. The ribbon-shaped stack in the heated roll couple heats up so much at its top and bottom surfaces that the first and second adhesive net ribbons 12, 14 melt/tackify point-and/or linewise. The pressure roll couple exerts sufficient pressure on the stack for the briefly molten/tacky adhesive net ribbons 12, 14 to bond the woven drainage fabric ribbon 13 to the filtration membrane ribbons 11, 15. The adhesive net ribbons 12, 14 cool down after exiting from the nip of the roll couple 41, 42 and thereby bond the woven drainage fabric ribbon 13 durably and face-touchingly to the filtration membrane ribbons to form the continuous ribbon material 20. The continuous ribbon material 20 is used to fabricate blanks having a geometry appropriate to the particular use. The blanks are closed/sealed liquidtight all around edgeside. Such a blank of rectangular shape is shown by FIG. 1.

The both-sided point- and/or line-shaped bonds between the woven drainage fabric 13 and the filtration membrane ribbons 11, 15 through the molten/tacky adhesive net ribbons 12, 14 result in a very high pressure stability for the composite filter material, since the number of bonding points/lines is very large. When an internal pressure is applied to a filter element fabricated from the filter composite material, this type of bonds prevent any inflation on the part of the filter element, so that cleaning adjacent filter elements by means of backflushing neither damages the adjacent filter elements nor makes it possible for them to block each other.

FIG. 3 shows a perspective sectional view of a flat filter element 100 fabricated inexpensively from a blank cut out of the continuous ribbon material 20 produced in a quasi continuous process. The flat filter element 100 consists of a frame 120 which has a very low resistance to flow. The frame 120 accommodates, symmetrically from out to in, two filtration membranes 101, 105, two adhesive nets 102, 104 and a woven drainage fabric 103.

The total area of the flat filter element 100 accommodates one outflow opening 140, which extends through the thickness of the filter element 100. It is also possible for two or more outflow openings 140 to be provided, each accommodated in equally sized subareas of the total area. Each such outflow opening then sits at the midpoint of the corresponding subarea.

The outflow opening 140 is sealed/closed along the edges 141 to be liquidtight with regard to the individual plies of the filter element 100. On both sides of the outflow opening 140 are outflow lines 130, 131 which ensure a substantially constant transmembrane differential pressure of the permeate over the filter element 100. This ensures uniform filter cake growth and hence economical filter utilization. This effect is augmented for example by a woven drainage fabric the flow resistance of which decreases with decreasing distance from the outflow opening/line. The flow resistance of the woven drainage fabric can further be reduced by reducing the woven drainage fabric thickness and/or the number of woven drainage fabric layers.

We claim:

1. A liquid-filtration composite material comprising five layers, including (i) a drainage fabric having a top and a bottom side and (ii) first and second filtration membranes laminated to the top and bottom sides of the drainage fabric, wherein the lamination between the drainage fabric and the filtration membranes has a dynamic pressure stability above 0.15 bar,
    wherein the drainage fabric and the filtration membranes are laminated to each other by two flat adhesive nets disposed on opposing sides of the drainage fabric, said nets extending down the drainage fabric length and across the drainage fabric width within the composite material interior,
    the adhesive nets have a basis weight in the range from 20 to 80 g·m$^{-2}$ and a mesh density in the range from 100 000 to 400 000 m$^{-2}$,
    the filtration membranes are formed from a support nonwoven and a porous membrane layer.

2. The filter composite material according to claim 1, wherein the lamination between the drainage fabric and the filtration membranes has a dynamic pressure stability above 0.2 bar.

3. The filter composite material according to claim 2, wherein the lamination between the drainage fabric and the filtration membranes has a dynamic pressure stability above 0.25 bar.

4. The filter composite material according to claim 2, wherein the lamination between the drainage fabric and the filtration membranes has a dynamic pressure stability above 0.3 bar.

5. The filter composite material according to claim 1, wherein said filter composite material is ribbon shaped and has a length in the range from 5 to 500 m.

6. The filter composite material according to claim 5, wherein said filter composite material has a width in the range from 0.5 to 20 m.

7. The filter composite material according to claim 6, wherein the filter composite material has a width in the range from 0.8 to 10 m.

8. The filter composite material according to claim 6, wherein the filter composite material has a width in the range from 0.9 to 2 m.

9. The filter composite material according to claim 5, wherein the filter composite material has a length in the range from 10 to 100 m.

10. The filter composite material according to claim 5, wherein the filter composite material has a length in the range from 20 to 60 m.

11. The filter composite material according to claim. 1 wherein the adhesive net consists of a thermoplastic polymer having a melting point in the range from 80 to 200° C.

12. The filter composite material according to claim 11, wherein the adhesive net consists of a thermoplastic polymer having, a inciting point in the range from 100 to 180° C.

13. The filter composite material according to claim 11, wherein the adhesive net consists of a thermoplastic polymer having a melting point in the range from 120 to 160° C.

14. The filter composite material according to claim 1, wherein the adhesive net has a basis weight in the range from 10 to 80 g·m$^{-2}$.

15. The filter composite material according to claim 14, wherein the adhesive net has a basis weight in the range from 20 to 60 g·m$^{-2}$.

16. The filter composite material according to claim 14, wherein the adhesive net has a basis weight in the range from 30 to 50 g·m$^{-2}$.

17. The filter composite material according to claim 1, wherein the adhesive net has a mesh density in the range from 10 000 to 400 000 m$^{-2}$.

18. The filter composite material according to claim 17, wherein the adhesive net has a mesh density in the range from 100 000 to 350 000 m$^{-2}$.

19. The filter composite material according to claim 17, wherein the adhesive net has a mesh density in the range from 200 000 to 300 000 m$^{-2}$.

20. The Filter composite material according to claim 1, wherein the filtration membranes each consist of a support nonwoven and a porous membrane layer, the support nonwoven being disposed adjacent to the drainage fabric.

21. The filter composite material according to claim 20, wherein the porous membrane layer is bonded to the support nonwoven by wet coagulation.

22. The filter composite material according to claim 20, wherein the porous membrane layer is laminated on the support nonwoven.

23. A method for producing a filter composite material according to claim 1 comprising
    supplying each of a first ribbon-shaped filtration membrane, a first ribbon-shaped flat adhesive net of thermoplastic polymer, a ribbon-shape drainage fabric, a second ribbon-shaped flat adhesive net of thermoplastic polymer and a second ribbon-shaped filtration membrane from a separate stock reservoir reel,
    combining the first filtration membrane, first adhesive net, drainage fabric, second adhesive net and second filtration membrane in a pressure roll couple to form a ribbon-shaped stack,
    heating the ribbon-shaped stack at its top and bottom sides in a heated roll couple to melt the first and second adhesive nets and subsequently cooling the same, thereby imparting durable, adhesive line-shaped bonds between the drainage fabric and the filtration membranes.

24. A method for producing flat filter element from a filter composite material formed according to claim 23, said method further comprising fabricating a blank having an appropriate geometry for a particular application from the filter composite material and sealing the filter composite material liquidtight all around edgeside.

25. A flat filter element formed from a filter composite material according, to claim 1 in a square, rectangular, hexagonal, oval or round shape.

26. A flat filter element formed from a filter composite material according to claim 1, wherein said flat filter element has a through-fiowable interior space sealed liquidtight edgeside and connected via one or more outflow openings in the filter composite material to one or more outflow lines.

27. The flat filter element according to claim 26, wherein under conditions of a varying pressure load said flat filter element survives an internal pressure of above 0.15 bar intact and said flat filter element is attached directly to an individual frame.

28. The flat filter element according to claim 27, wherein said flat filter element survives an internal pressure of above 0.2 bar intact.

29. The flat filter element according to claim 27, wherein said flat filter element survives an internal pressure of above 0.3 bar intact.

30. The filter composite material according to claim 1, wherein said adhesive nets (i) define a repeating pattern, (ii) are flat, and (iii) form line-shaped bonds between said drainage fabric and said filtration membranes,
and said bonds prevent inflation of the filter element when internal pressure is applied.

31. A wastewater filter composite material comprising five layers, including (i) a drainage fabric having a top and a bottom side and (ii) first and second filtration membranes laminated to the top and bottom sides of the drainage fabric, wherein the lamination between the drainage fabric and the filtration membranes has a dynamic pressure stability above 0.15 bar, the drainage fabric and the filtration membranes laminated to each other by two flat adhesive nets disposed on each side of the drainage layer, said nets extending down the drainage fabric length and across the drainage fabric width within the composite material interior, wherein the drainage fabric is a loop-formingly knitted spacer fabric comprising first and second sheets having a thermally cured loop structure and a system of pile threads disposed between said first and second sheets, said system of pile threads having a height ranging from 0.3 to 10 mm, said pile threads passing alternatingly through loops of the first and second loop structures,
the filtration membranes are formed from a support nonwoven and a porous membrane layer.

32. The filter composite material according to claim 31, wherein said pile threads have an embossed saw-tooth or spiral shape.

* * * * *

UNITED STATES PATENT AND TRADEMARK OFFICE
CERTIFICATE OF CORRECTION

PATENT NO. : 9,630,148 B2  
APPLICATION NO. : 12/936874  
DATED : April 25, 2017  
INVENTOR(S) : Meyer-Blumernorth et al.

Page 1 of 1

It is certified that error appears in the above-identified patent and that said Letters Patent is hereby corrected as shown below:

On the Title Page

Item [56], References Cited, FOREIGN PATENT DOCUMENTS:
Delete "WO 99/36150 A1 7/1999" and insert --WO 99/18033 A1 4/1999--

Signed and Sealed this
Fourth Day of July, 2017

Joseph Matal
*Performing the Functions and Duties of the*
*Under Secretary of Commerce for Intellectual Property and*
*Director of the United States Patent and Trademark Office*